US010807214B2

(12) United States Patent
Thayer et al.

(10) Patent No.: US 10,807,214 B2
(45) Date of Patent: Oct. 20, 2020

(54) LASER ASSISTED SURFACE FINISHING APPARATUS AND METHOD

(71) Applicant: United Technologies Corporation, Farmington, CT (US)

(72) Inventors: Henry H. Thayer, Wethersfield, CT (US); Anthony Patrick Ventura, South Glastonbury, CT (US); Wendell V. Twelves, Glastonbury, CT (US); Michael Walter Bennett, Lebanon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 306 days.

(21) Appl. No.: 15/843,312

(22) Filed: Dec. 15, 2017

(65) Prior Publication Data
US 2019/0184521 A1    Jun. 20, 2019

(51) Int. Cl.
| B24C 1/10 | (2006.01) |
| B23K 26/354 | (2014.01) |
| B23K 26/00 | (2014.01) |
| C21D 7/06 | (2006.01) |
| B23P 25/00 | (2006.01) |

(52) U.S. Cl.
CPC ............. B24C 1/10 (2013.01); B23K 26/354 (2015.10); B23K 26/0093 (2013.01); B23P 25/006 (2013.01); C21D 7/06 (2013.01)

(58) Field of Classification Search
CPC ...... B24C 1/10; B23K 26/354; B23K 26/0093
USPC .................................................. 219/121.66
See application file for complete search history.

(56) References Cited

U.S. PATENT DOCUMENTS

| 5,174,143 A | 12/1992 | Martin |
| 5,302,218 A | 4/1994 | Shirai et al. |
| 6,183,348 B1 | 2/2001 | Bingham et al. |
| 7,887,393 B2 | 2/2011 | Mase et al. |
| 2008/0213978 A1 | 9/2008 | Henry et al. |

FOREIGN PATENT DOCUMENTS

| CA | 3014855 | 8/2017 |
| CN | 102896585 | 1/2013 |
| CN | 203393190 | 1/2014 |
| JP | H0551629 | 3/1993 |
| JP | H10286774 | 10/1998 |

OTHER PUBLICATIONS

J. Noordhuis, J.Th.M. De Hosson, Surface modification by means of laser melting combined with shot peening: A novel approach, May 22, 1992, vol. 40, No. 12, pp. 3317-3324, Great Britain.
The Extended European Search Report for EP Application No. 182120857, dated Apr. 17, 2019.
M. Schilling-Praetzel, (1993) Influence of Temperature of Shot Peening on Fatigue Life, Sep. 17, 1993, pp. 227-238.

Primary Examiner — Vishal Pancholi
(74) Attorney, Agent, or Firm — Carlson, Gaskey & Olds, P.C.

(57) ABSTRACT

An apparatus for finishing a component includes at least one articulating arm having a shot peening apparatus and at least one laser source. A plurality of laser redirectors are configured to redirect a laser originating from the laser source. Each laser redirector in the plurality of laser redirectors is mounted to a first rail and a second rail. A controller is controllably coupled to the articulating arm and each of the rails such that output signals from the controller control a position of the articulating arm, and a position of each laser redirector in the plurality of laser redirectors.

9 Claims, 2 Drawing Sheets

Title

LASER ASSISTED SURFACE FINISHING APPARATUS AND METHOD

TECHNICAL FIELD

The present disclosure relates generally to a method and apparatus for finishing surfaces of a part, and more specifically to a method and apparatus for laser assisted shot peening of the surface.

BACKGROUND

Various techniques for manufacturing components, such as those used in complex machinery, can result in flaws or defects at or near the surface of the manufactured component. By way of example, an additively manufactured component can generally have high surface roughness, porosity, and fissures in the surface of the component. In order to reduce the impact of, or remove the presence of, the flaws or defects, parts susceptible to such flaws are typically subjected to one or more finishing processes. One finishing process used in such applications is shot peening.

While additively manufactured components comprised of certain materials can be particularly susceptible to such flaws or defects, it can also be desirable to apply similar finishing processes to components constructed according to alternative manufacturing processes including casting and milling.

SUMMARY OF THE INVENTION

An exemplary method for finishing a surface includes, contacting a surface with a laser, rastering the laser across an area of the surface, thereby generating a local soft area, and shot peening the local soft area, thereby achieving a shot peened finish.

In another example of the above described exemplary method for finishing a surface rastering the surface comprises moving at least one laser redirector relative to the surface.

Another example of any of the above described exemplary methods for finishing a surface further includes moving a shot peen nozzle relative to the surface.

In another example of any of the above described exemplary methods for finishing a surface the shot peen nozzle moves independently of at least one laser redirector.

Another example of any of the above described exemplary methods for finishing a surface further includes preventing at least one of errant shot and reflected shot from intersecting the laser.

In another example of any of the above described exemplary methods for finishing a surface preventing the at least one of errant shot and reflected shot from intersecting the laser is at least partially achieved by disposing a shot guard between a shot peen nozzle and the laser.

In another example of any of the above described exemplary methods for finishing a surface preventing the at least one of errant shot and reflected shot from intersecting the laser is at least partially achieved by angling the shot peen nozzle relative to the laser.

In another example of any of the above described exemplary methods for finishing a surface preventing the at least one of errant shot and reflected shot from intersecting the laser is at least partially achieved by disposing a shot guard between a shot peen nozzles and the laser and by angling the shot peen nozzle relative to the laser.

Another example of any of the above described exemplary methods for finishing a surface further includes allowing the local soft area to partially cool for a duration after the laser has rastered across the area and before shot peening the local area.

In another example of any of the above described exemplary methods for finishing a surface the duration is in the range of about 1-10 ms.

In another example of any of the above described exemplary methods for finishing a surface the laser has a spot size in the range of about 100 microns to 1 mm.

In another example of any of the above described exemplary methods for finishing a surface the surface is a complex surface, and a plurality of laser redirectors and a shot peen nozzle move in multiple planes.

In one exemplary embodiment an apparatus for finishing a component includes at least one articulating arm including a shot peening apparatus, at least one laser source, a plurality of laser redirectors configured to redirect a laser originating from the laser source, each laser redirector in the plurality of laser redirectors being mounted to a first rail and a second rail, and a controller controllably coupled to the articulating arm and each of the rails such that output signals from the controller control a position of the articulating arm, and a position of each laser redirector in the plurality of laser redirectors.

In another example of the above described apparatus for finishing a component the laser has a spot size in the range of about 100 microns to 1 mm.

In another example of any of the above described apparatus for finishing a component the plurality of laser redirectors includes at least three laser redirectors.

In another example of any of the above described apparatus for finishing a component the plurality of laser redirectors defines at least six axis of redirection.

In another example of any of the above described apparatus for finishing a component the articulation arm is controllable independent of the plurality of laser redirectors.

Another example of any of the above described apparatus for finishing a component further includes at least a second laser source.

These and other features of the present invention can be best understood from the following specification and drawings, the following of which is a brief description.

DETAILED DESCRIPTION

Additively manufactured components, as well as some components manufactured using other manufacturing techniques, can include undesirable characteristics such as high surface roughnesses, undesirable porosity at or near the surface, and fissures in one or more of the exterior surfaces of the component. Many internal flaws can be corrected using a hot isostatic press finishing technique. However, hot isostatic pressing is ineffective at addressing surface roughness and porosity near the surface of a workpiece.

Shot peening is one alternative that can be used to flatten or otherwise finish the surfaces of additively manufactured components Shot peening is a cold working process that produces a compressive residual stress layer at the surface of a component and modifies mechanical properties of metals and composites. Shot peening entails repeatedly impacting a surface with shot (e.g. round metallic, glass, or ceramic particles) with force sufficient to create plastic deformation in the surface.

However, in some cases additively manufactured materials can have surface conditions and flaws that shot peening at room temperature is incapable of mitigating. Softening the material, such as by the application of localized heat, prior to impacting the surface with the shot can reduce the resistance to deformation of the surface thereby facilitating a shot peen finishing method.

Further, because shot peening involves repeatedly impacting a surface with multiple hard spheroids to generate plastic deformation in the surface, it is necessary that the surface of the material be more susceptible to deformation than the spheroids themselves. If the surface is less susceptible to the deformation, then the spheroids will deform and there will be relatively little impact on the surface itself. Some materials utilized in additively manufactured components and in similar components are less susceptible to deformation at room temperature than the shot from the shot peening process.

Figure 1:
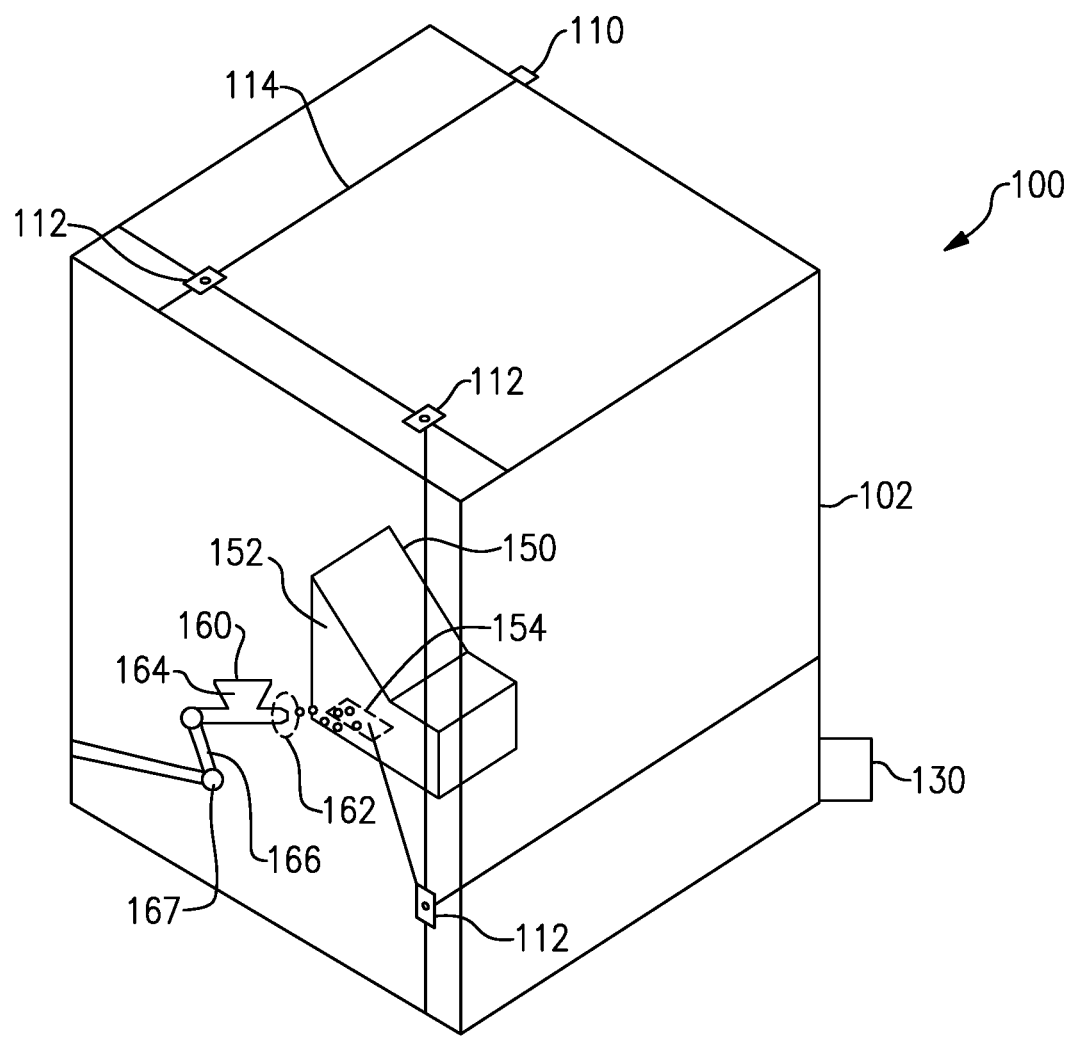
FIG. 1 illustrates a schematic view of a component finishing apparatus.

FIG. 1 schematically illustrates an exemplary finishing apparatus 100 configured to apply a laser generated from a laser source 110 to a surface 152 of a component 150. The laser source 110 is fixedly mounted to a housing 102, and multiple laser redirectors 112 direct and focus the laser to the desired portion of the surface 152. The laser heats the surface creating a localized soft area 154 of the surface 152 that is then subjected to shot peening. Each of the laser redirectors 112 is mounted to two tracks 114, with the position of the laser redirector 112 sliding along the tracks 114 to which the laser redirector 112 is mounted. In the illustrated configuration, three laser redirectors 112 are utilized allowing for six axis of movement. It is appreciated that more, or less, laser redirectors 112 can be utilized in a practical example, depending on the degrees of movement necessary to generate the desired local soft area 154 of the surface 152. The number of laser redirectors 112 determines the angles that the laser can use, with more redirectors 112 allowing for more lasers. The more angles available to the lasers, the more complex the surface 152 being finished can be.

Also included within the apparatus 100 is a shot peen machine 160 including at least a nozzle 162, a hopper 164, and an articulation arm 166. In alternative examples, alternative apparatuses for providing shot to the nozzle 162 can be utilized in place of the hopper 164. The articulation arm 166 includes multiple joints 167 that allow the articulation arm 166 to adjust the position and angle of the nozzle 162, ensuring that the nozzle 162 is maintained a predefined distance from the surface 152 of the component during the shot peening operation.

A controller 130, such as a computer or other processing device, is connected to the apparatus 100 and controls the positions of the laser redirectors 112 and the position of the shot peen nozzle 162 during the shot peening operation. The shot peen nozzle 162 and the laser redirectors 112 are operated independently of each other, are not maintained in static positions relative to each other. The apparatus 100 can include multiple sensors, motors, processors, and the like in any configuration necessary to control the laser redirectors 112, the shot peen machine 160 and any other automated components according to any known method.

Figure 2:
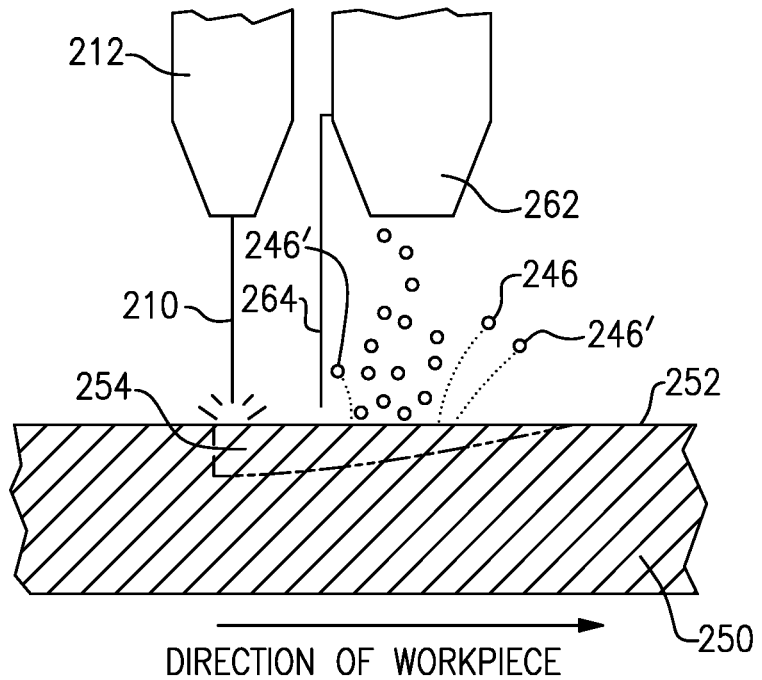
FIG. 2 schematically illustrates a view of a simple surface of a component during a finishing process.

With continued reference to FIG. 1, and with like numerals indicating like elements, FIG. 2 schematically illustrates a view of a single surface of a component being finished within a finishing apparatus, such as the apparatus 100. Initially a laser 210 is redirected by a laser redirector 212, and contacts a surface 252 of the component 250. The surface area of the contact between the laser 210 and the surface 252 is referred to as a spot size. In some practical implementations the spot size can range from 0.01 mm to 1 mm, with the size of the spot and the power of the laser affecting the magnitude of heat imparted into the surface as the laser 210 is rastered across the surface 252.

The laser 210 is rastered across a targeted area of the surface 252, thereby generating a localized soft area 254. The localized soft area 254 is a portion of the surface 252 that extends into the component and has been heated by the laser 210. Heating to create the localized soft area increases the susceptibility of the localized soft area 254 to deformation from shot peening impacts, thereby increasing the effectiveness of the shot peening.

The laser 210 heats the localized soft area 254 to a sufficient level to allow for the increased deformation of the surface 252, without melting the surface 252 and creating a melt pool, and without heating the entire thickness of the surface 252. The depth into the surface 252 of the localized soft area 254 is greatest at the position of the laser spot, and decreases in depth as the localized soft area 254 cools. In order to ensure that a desired depth of the localized soft area 254 is present when the localized soft area 254 is subject to the shot peening from the nozzle 262 a time delay is implemented between when a portion of the localized soft area 254 is initially rastered by the laser 210 and when the portion is subjected to the shot peening. In some examples, the time delay can be in the range of 1 to 10 ms.

Once subjected to the shot peening, the localized soft area 254 is allowed to cool convectively. In alternative examples, alternative cooling techniques could be utilized to similar effect. In yet further examples, the shot peening itself can actively cool the localized soft area 254.

During operation of the apparatus 100, after the shot 246 impacts the soft area 254, the shot 246' reflects in random directions. In addition, in order to improve the results of the shot peening process, the shot 246 exits the nozzle in a semi random spray. If errant shot 246', or reflected shot 246', intercepts the laser 210, contact between the laser 210 and the surface 252 is temporarily interrupted. This interruption can potentially result in insufficiently softened portions of the localized soft area 254. In order to prevent errant shot 246' and reflected shot 246' from interfering with the laser 210, a shot guard 264 is mounted to the nozzle 262. The shot guard extends from the nozzle 262 toward the surface 252 and blocks reflected and errant shot 246'. In alternative examples, the nozzle 262 can be angled, relative to the laser 210, such that shot 246 from the nozzle 262 is directed away from the laser 210 when the shot 246' is reflected off the surface 252. In yet further alternate examples, the nozzle 262 can be angled and a shot guard 264 can be incorporated for redundant protection.

Figure 3:
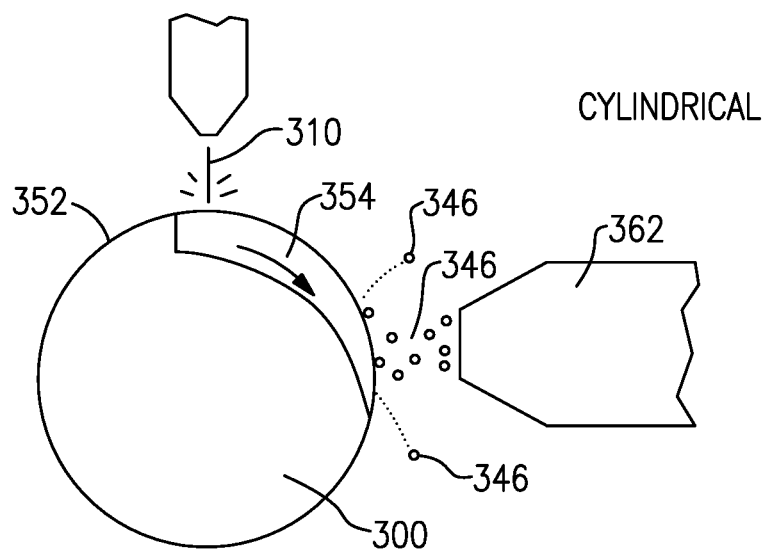
FIG. 3 schematically illustrates a schematic view of a curved surface of a component being finished.

With continued reference to FIGS. 1 and 2, FIG. 3 schematically illustrates an alternate component 300 being finished in a finishing apparatus, such as the apparatus 100 of FIG. 1. The alternate component 300 includes a single curved surface, although it is envisioned that surfaces include more complex curvature could be utilized in a similar manner, subject to the capabilities of the shot peen nozzle. As the laser 310 is redirected independent of the articulation of the shot peen nozzle 362 the laser 310 can travel along substantially complex surfaces 352, generating the desired localized soft area 354. As used herein, complex surfaces refers to any surface including a substantially varied radius of curvature across the surface. In such an example the localized soft area 354, and the laser 310 heating, function substantially similarly to the example described above with regards to FIG. 2.

With reference to FIGS. 1-3, the creation of the localized soft area 254, 354, via the application of the laser energy, renders the localized soft area 254, 354 more ductile, thereby allowing the shot peen to more easily close or flatten imperfections in the surface at the localized soft area. The shot peen flattens high spots, collapses porosity, and closes fissures that can result at or near the surface in an additively manufactured component. Further as described above, the shot 246, 346 can facilitate cooling of the localized soft area 254, 354 by carrying away heat in addition to the convective cooling, returning the component to ambient temperatures relatively quickly.

While illustrated in the exemplary embodiment of FIGS. 1-3 as including only a single laser source, it should be appreciated that multiple laser sources could be used to further enable rastering across distinct angles and complex curves.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for finishing a surface comprising:
   contacting a surface with a laser;
   rastering the laser across an area of the surface, thereby generating a local soft area;
   shot peening the local soft area, thereby achieving a shot peened finish; and
   preventing at least one of errant shot and reflected shot from intersecting the laser at least partially by disposing a shot guard between a shot peen nozzle and the laser.

2. The method of claim 1, wherein rastering the surface comprises moving at least one laser redirector relative to the surface.

3. The method of claim 2, further comprising moving a shot peen nozzle relative to the surface.

4. The method of claim 3, wherein the shot peen nozzle moves independently of at least one laser redirector.

5. A method for finishing a surface comprising:
   contacting a surface with a laser;
   rastering the laser across an area of the surface, thereby generating a local soft area;
   shot peening the local soft area, thereby achieving a shot peened finish; and preventing at least one of errant shot and reflected shot from intersecting the laser by disposing a shot guard between a shot peen nozzles and the laser and by angling the shot peen nozzle relative to the laser.

6. The method of claim 1, further comprising allowing the local soft area to partially cool for a duration after the laser has rastered across the area and before shot peening the local area.

7. The method of claim 6, wherein the duration is in the range of about 1-10 ms.

8. The method of claim 1, wherein the laser has a spot size in the range of about 100 microns to 1 mm.

9. The method of claim 1, wherein the surface is a complex surface, and a plurality of laser redirectors and a shot peen nozzle move in multiple planes.

* * * * *